Patented Mar. 23, 1937

2,074,814

UNITED STATES PATENT OFFICE 2,074,814

RESINOUS COMPOSITIONS AND PROCESS OF MAKING SAME

Wilfred Winter Smith, Kenmore, N. Y., assignor to E. I. du Pont de Nemours & Company, Wilmington, Del., a corporation of Delaware No Drawing. Application November 5, 1935, Serial No. 48,446

11 Claims. (Cl. 134—26)

This invention relates to resinous materials, and more particularly to a method for making improved resinous compositions from urea-formaldehyde reaction products and fattye oil or fatty oil acid modified polyhydric alcohol-polybasic acid resins.

The resinous products obtained from the reaction of urea and formaldehyde possess certain disadvantages in their use as coating compositions. Among these disadvantages there may be noted the lack of flexibility in the film. Further the resins are sparingly soluble in the usual organic solvents which introduces difficulties in their application. These resinous materials, however, possess certain desirable properties of being relatively colorless and of hardening rapidly under the influence of heat. Attempts have been made to prepare coating compositions from the resinous materials obtained from the reaction of urea and aldehydes but with apparently little commercial success. The fatty oil and fatty oil acid modified polyhydric alcohol-polybasic acid resins are used as protective and decorative coating compositions quite satisfactorily but for many purposes require longer heat treatments to produce satisfactorily hard films than is often practical. It has previously been proposed to combine the reaction product of urea and formaldehyde with the fatty oil modified alkyd or polyhydric alcohol-polybasic acid resins. The prior practice has been concerned, however, more particularly with the combination of the urea-formaldehyde reaction product with hydroxylated oil (e. g. castor oil) modified alkyd resins because of the difficulties, including incomplete compatibility of the two materials and inability to produce clear compositions, encountered when it is attempted to combine the urea-formaldehyde reaction product with alkyd resins modified with oils of the non-hydroxylated type.

This invention has as an object a method for preparing new and useful resinous compositions comprising a combination of the reaction product of urea and aldehydes with non-hydroxylated fatty oil and fatty oil acid modified polyhydric alcohol-polybasic acid resins. A further object is a process of the kind just mentioned which is successfully applicable to alkyd resins modified with drying and semi-drying oils as well as with non-drying oils. A further object is the production of new and useful resinous compositions of urea-formaldehyde condensation and non-hydroxylated fatty oil modified alkyd resins. Other objects will appear hereinafter.

These objects are accomplished according to the present invention by preparing the fatty oil or fatty oil acid modified polyhydric alcohol-polybasic acid resin in the presence of an amount of polyhydric alcohol in excess of that required as the theoretical quantity necessary for the reaction and then combining the alkyd resin in solution in organic solvent with a suspension of urea-formaldehyde reaction product in organic solvent. Conveniently I add to the alkyd resin a suspension of the urea-formaldehyde reaction product in an organic liquid in which the alkyd resin is soluble. If desired, the alkyd resin may first be dissolved in the organic solvent and the urea-formaldehyde reaction product added to the solution of the alkyd resin. Although the use of a suspension rather than a solution of urea-formaldehyde reaction product is not a theoretical requirement, it is a fact that this reaction product is generally insoluble in organic liquids and is soluble at best only to the extent of about 10% in water. However, when the urea-formaldehyde reaction product is combined, usually with heat and agitation, with the polyhydric alcohol-polybasic acid resin in the presence of organic solvent as described above, there is obtained a homogeneous blend which, for all practical purposes and as far as visual conception is concerned, contains the urea-formaldehyde reaction product in solution.

Oil modified alkyd resins with which the present invention is concerned are polyhydric alcohols having some of their hydroxyl groups esterified with polybasic acid radicals and some esterified with the acid radicals of non-hydroxylated, non-drying, semi-drying or drying oil acids. These resins may be made by reacting simultaneously with heat treatment polyhydric alcohol, polybasic acid and the acids derived from a fatty oil. Or the polyhydric alcohol may be first reacted in the presence of an alcoholysis catalyst with the fatty oil itself and the resulting polyhydric alcohol partially acylated with fatty oil acid reacted with polybasic acid until resinification takes place.

As indicated above, the blending of the urea-aldehyde reaction product with the polyhydric alcohol-polybasic acid resin is accomplished in the present invention through the presence of free hydroxyl groups in the resin molecule. These free hydroxyl groups are provided by the excess polyhydric alcohol over that required for stoichiometric proportions. It will be observed that the procedure claimed herein is not necessary in the case of hydroxylated oils such as castor oil which provide the necessary hydroxyl groups.

The present invention, then, is directed to a process whereby it is possible to homogeneously combine urea-aldehyde reaction product with polyhydric alcohol-polybasic acid resins made with non-hydroxylated oils generally whether they be non-drying, semi-drying, or drying oils.

The new resinous combinations may be illustrated by the following examples in which the parts are by weight, but it is to be understood, however, that the invention is not limited thereto except as indicated in the appended claims.

*Example I*

35 parts perilla oil and 7 parts of glycerine were heated with agitation in a suitable container. When the temperature of the mixture reached 140–160° C. 0.03 part of sodium hydroxide was added and the heating continued until the mixture reached a temperature of 220–240° C. The mixture was maintained at this temperature range until it became clear and homogeneous and a sample removed therefrom was soluble in 2 parts of methyl alcohol. At this stage 50.3 parts of phthalic anhydride were added and the heating continued until the temperature was raised to 220–225° C. at which point 16.5 parts of glycerine were added and the mass maintained at a temperature of 220–225° C. for such time as is required for the material to have an acid number of 45±5.

100 parts of the resinous composition thus prepared were dissolved in 200 parts of monoethyl ether of ethylene glycol. To this were added 100 parts of the reaction product of urea and formaldehyde and the mixture heated to between 90–100° C. with vigorous agitation. The mass was maintained at this temperature until substantially all of the reaction product of urea and formaldehyde was dissolved in the polyhydric alcohol-polybasic acid resin. The material was then allowed to cool and was strained to remove any extraneous material.

*Example II*

To 50 parts of soya bean oil were added 10 parts of glycerine and 0.05 part of litharge. This mixture was suitably heated with agitation at a temperature of from 220–240° C. until a sample removed therefrom was clear and homogeneous and was soluble in two parts of methyl alcohol. At this stage 38.7 parts of phthalic anhydride and 10.1 parts of glycerine were added and the heating continued at a temperature of 220–225° C. until the material possessed an acid number of approximately 35±5.

24 parts of the reaction product of urea and formaldehyde were suspended with agitation in 52 parts of monoethyl ether of ethylene glycol. This mixture was heated and 24 parts of the alkyd resin prepared as above were added while the mixture was still hot, and the temperature raised to 90–100° C. The mixture was kept at this temperature and thoroughly agitated until substantially all of the reaction product of urea and formaldehyde was dissolved. After cooling the resinous solution was filtered or strained to remove any extraneous material.

*Example III*

A mixture of 45 parts of rapeseed oil, 9 parts of glycerine and 0.1 part of litharge was heated with thorough agitation at a temperature of 220–240° C. until the mixture was clear and homogeneous and a sample removed therefrom was found to be soluble in 2 parts of methyl alcohol. To this mass was added 42.5 parts of phthalic anhydride and 12.6 parts of glycerine and the heating continued with agitation at a temperature of from 220–225° C. until the sample had an acid number of approximately 25 to 45.

24 parts of the reaction product of urea and formaldehyde were suspended with agitation in 52 parts of monoethyl ether of ethylene glycol and to this were added 24 parts of the alkyd resin as prepared while still hot. The mass was then heated to a temperature of from 90–100° C. and maintained at this temperature with thorough agitation until substantially all of the solid was dissolved. The resinous solution was then allowed to cool and filtered or strained to remove any foreign material.

*Example IV*

50 parts of menhaden oil, 10 parts of glycerine and 0.1 part of litharge were heated with agitation at a temperature of 220–240° C. until the mass became clear and homogeneous and a sample removed therefrom was soluble in 2 parts of methyl alcohol.

38.7 parts phthalic anhydride and 9 parts of glycerine were then added and the heating continued at a temperature of 220–225° C. until the material possessed an acid number of approximately 10 to 30.

24 parts of the reaction product of urea and formaldehyde were suspended with agitation in 52 parts monoethyl ether of ethylene glycol. To this suspension was added with thorough agitation 24 parts of the resin as prepared above and the mass maintained at a temperature of between 90–100° C. with thorough agitation until substantially all of the solid material had dissolved. The resin solution thus prepared was allowed to cool and filtered or strained to remove any extraneous material.

*Example V*

39.2 parts of coconut oil and 7.8 parts of 95% glycerol and 0.04 part of sodium hydroxide were heated with suitable agitation at 225–240° C. and this temperature range maintained until a sample of the material was clear and homogeneous and soluble in 2 parts of methyl alcohol. At this stage 39.9 parts of phthalic anhydride and 13.1 parts of 95% glycerol were added and the mass heated to 220–225° C. for such a time as was required to obtain an acid number of 40±5.

100 parts of the reaction product of urea and formaldehyde were then suspended in 200 parts of monoethyl ether of ethylene glycol and 100 parts of the resin prepared as described above was added to this suspension. The entire mass was then heated to a temperature of 95–100° C. and held at this temperature range until substantially all of the reaction product of urea and formaldehyde was dissolved. The material was then allowed to cool and strained to remove any extraneous material. A film deposited from this material after being dried at approximately 100° C. for possibly 15 minutes was found to yield a hard, tough and water resistant coating.

The solutions of the resin combinations as prepared may be used as unpigmented coatings or there may be incorporated therewith pigments to produce colored coating compositions or enamels. Fillers may also be introduced with the pigments according to practices well known to those skilled in the art of preparing resinous coating compositions. The resin solutions may be used with cellulose derivative compositions as for example cellulose nitrate dispersions to produce lacquers. Such lacquers may contain in addition other lacquer ingredients as softeners, plasticizers, other natural or synthetic resins, pigments, fillers, etc.

Other fatty oils than those noted in the examples may be used as modifiers for the polyhydric alcohol-polybasic acid resins including those comprising the non-hydroxylated, non-drying, semi-drying or drying oil class as linseed oil, cottonseed oil, coconut oil, etc. The process for preparing the resin combinations is thus applicable to combining those polyhydric alcohol-polybasic acid or alkyd type resins (i. e. the non-hydroxylated, non-drying, semi-drying, or drying oil modified type) which are ordinarily not compatible with the reaction product of urea and aldehydes such as formaldehyde.

To disperse the reaction product of urea and formaldehyde in combining it with the fatty oil or fatty oil acid modified polyhydric alcohol-polybasic acid resin other liquids than those described in the examples may be used as for example the methyl ether of ethylene glycol, ethyl alcohol, amyl alcohol, butyl alcohol, isobutyl alcohol and similar materials.

Although the amount of glycerol in excess of that theoretically required for complete esterification of the acid reactants in the preparation of polyhydric alcohol-polybasic acid resins of the examples is between approximately 10% and 22% this may conveniently vary between 5% and 30%, amounts less than 5% not yielding the optimum results and amounts over 30% being in excess of the maximum required. Glycerol is noted in the examples as the polyhydric alcohol used in the preparation of the alkyd resin. Other polyhydric alcohols as ethylene glycol, propylene glycol, diethylene and triethylene glycol may also be used, the same or a different polyhydric alcohol being used for the excess quantity over that necessary for the theoretical reaction. The choice of the polyhydric alcohol will depend to a large extent on the type of alkyd resin it is desired to combine with the reaction product of urea and formaldehyde and will be apparent to those skilled in the art of preparing such resins. Polybasic acids other than phthalic, such as succinic, maleic, etc., known to be useful for making alkyd resins may likewise be used in the practice of the present invention.

The reaction product of urea and formaldehyde may be prepared according to any of the well known procedures but preferably according to the procedure described in co-pending application Serial Number 34,300, filed August 1, 1935.

In the examples the ratio of the polyhydric alcohol-polybasic acid oil modified resin to the reaction product of urea and formaldehyde for the resinous combination is given as 1:1. This ratio may vary over rather wide limits although it is preferred not to have the ratio greater than 2:1 where the compositions are to be used for producing coatings for decorative and protective purposes.

Although coating compositions made from the resinous combination may form films by being air dried, the coatings are preferably baked at a temperature of approximately 200° F. for a period of ½ hour. The baking temperature may be varied to suit special needs, a range of between approximately 140° F. for 1 hour and 250° F. for 15 minutes having been found to be satisfactory. The time required to properly bake the coating to a hard, tough and still flexible film will vary, of course, with the temperature, the choice of the time being readily apparent to those skilled in the art of preparing such finishes. This general baking schedule is far superior, from an economic standpoint, to that required for organic enamel finishes of the present art which ordinarily require a baking time of from 2 to 3 hours at a temperature of 250° F. or higher.

The products of the invention are useful in preparing coating compositions for protective and decorative purposes on various types of surfaces such as wood, metal, glass, etc., either pigmented or not pigmented. They may be further used in combination with cellulose derivatives as the esters or ethers to produce lacquers as previously indicated. Other uses for the products of the invention, because of the very desirable properties possessed by them, will readily suggest themselves to those skilled in the art.

It will be apparent from the foregoing that I have provided a method whereby resinous combinations of fatty oil or fatty oil acid modified polyhydric alcohol-polybasic acid resins and the reaction product of urea and aldehyde may be prepared where the fatty oil or fatty oil acid is of the class comprising non-hydroxylated, non-drying, semi-drying and drying oils. Without the excess polyhydric alcohol, over the theoretical quantity necessary to produce the alkyd resin, compatible combinations are not obtained and an unsatisfactory product results. Through the practice of the present invention resinous combinations are made which produce coating compositions yielding hard, tough and at the same time highly water resistant films. The enamel coating compositions made from the resinous combination disclosed herein can be converted into hard, tough and durable protective coatings by baking at low temperatures.

As many apparently widely different embodiments of this invention may be made without departing from the spirit and scope thereof, it is to be understood that I do not limit myself to the specific embodiments thereof except as defined in the appended claims.

I claim:

1. A process which comprises combining a polyhydric alcohol-polybasic acid resin, containing in combined form the acid radicals of non-hydroxylated fatty oil acid, with urea-aldehyde reaction product, said resin being prepared with polyhydric alcohol in excess of from 5% to 30% of that required for complete esterification of the acid reactants.

2. A process which comprises forming a mixture of urea-aldehyde reaction product and a solution in organic solvent of polyhydric alcohol-polybasic acid resin containing in combined form the acid radicals of non-hydroxylated fatty oil acid and containing polyhydric alcohol in combined form in excess of from 5% to 30% of that required for complete esterification of the acid reactants, and heating said mixture until the urea-aldehyde reaction product is dissolved and a homogeneous blend is obtained.

3. A homogeneous mixture comprising urea-aldehyde reaction product blended with polyhydric alcohol-polybasic acid resin containing in combined form the acid radicals of non-hydroxylated fatty oil acid and containing polyhydric alcohol in combined form in excess of from 5% to 30% of that required for complete esterification of the acid reactants.

4. The process set forth in claim 1 in which the aldehyde is formaldehyde.

5. The process set forth in claim 2 in which the aldehyde is formaldehyde.

6. The process set forth in claim 1 in which the non-hydroxylated oil is drying oil.

7. The process set forth in claim 2 in which the non-hydroxylated oil is drying oil.

8. The process set forth in claim 1 in which the excess of said polyhydric alcohol is from 10% to 22%.

9. The process set forth in claim 1 in which said resin is a non-hydroxylated drying oil acid modified glyceryl phthalate resin.

10. The mixture set forth in claim 3 in which the excess of said polyhydric alcohol is from 10% to 22%.

11. The mixture set forth in claim 3 in which said resin is a non-hydroxylated drying oil acid modified glyceryl phthalate resin.

WILFRED WINTER SMITH.